United States Patent

DiSabato

[11] 4,045,957
[45] Sept. 6, 1977

[54] COMBINED GUIDE VANE AND MIXER FOR A GAS TURBINE ENGINE

[75] Inventor: Vincent J. DiSabato, Southington, Conn.

[73] Assignee: United Technologies Corporation, Hartford, Conn.

[21] Appl. No.: 659,889

[22] Filed: Feb. 20, 1976

[51] Int. Cl.² .............................................. F02K 3/06
[52] U.S. Cl. .................................................... 60/262
[58] Field of Search ........ 60/262; 181/33 HB, 33 HC

[56] References Cited

U.S. PATENT DOCUMENTS

| 3,048,376 | 8/1962 | Howald et al. | 60/262 |
| 3,377,804 | 4/1968 | Wright et al. | 60/262 |
| 3,385,064 | 5/1968 | Wilde et al. | 60/262 |
| 3,673,802 | 7/1972 | Krebs et al. | 60/262 |

Primary Examiner—Carlton R. Croyle
Assistant Examiner—Robert E. Garrett
Attorney, Agent, or Firm—Norman Friedland

[57] ABSTRACT

The multi-lobed mixer downstream of the turbine of a gas turbine engine is constructed to include the exit guide vanes for the turbine carried on the inner diameter of the mixer so as to prevent diffusing with a consequential reduction of pressure losses and engine weight.

5 Claims, 5 Drawing Figures

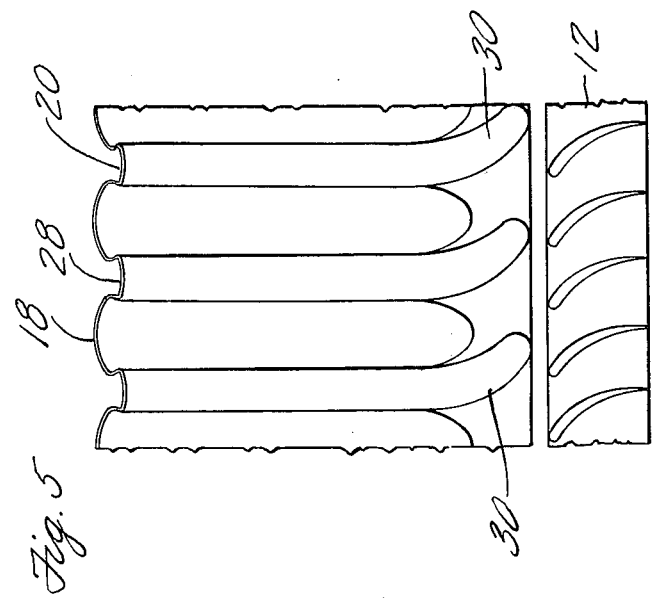
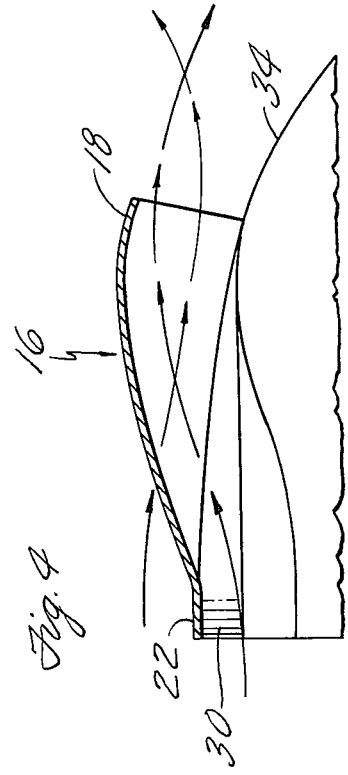
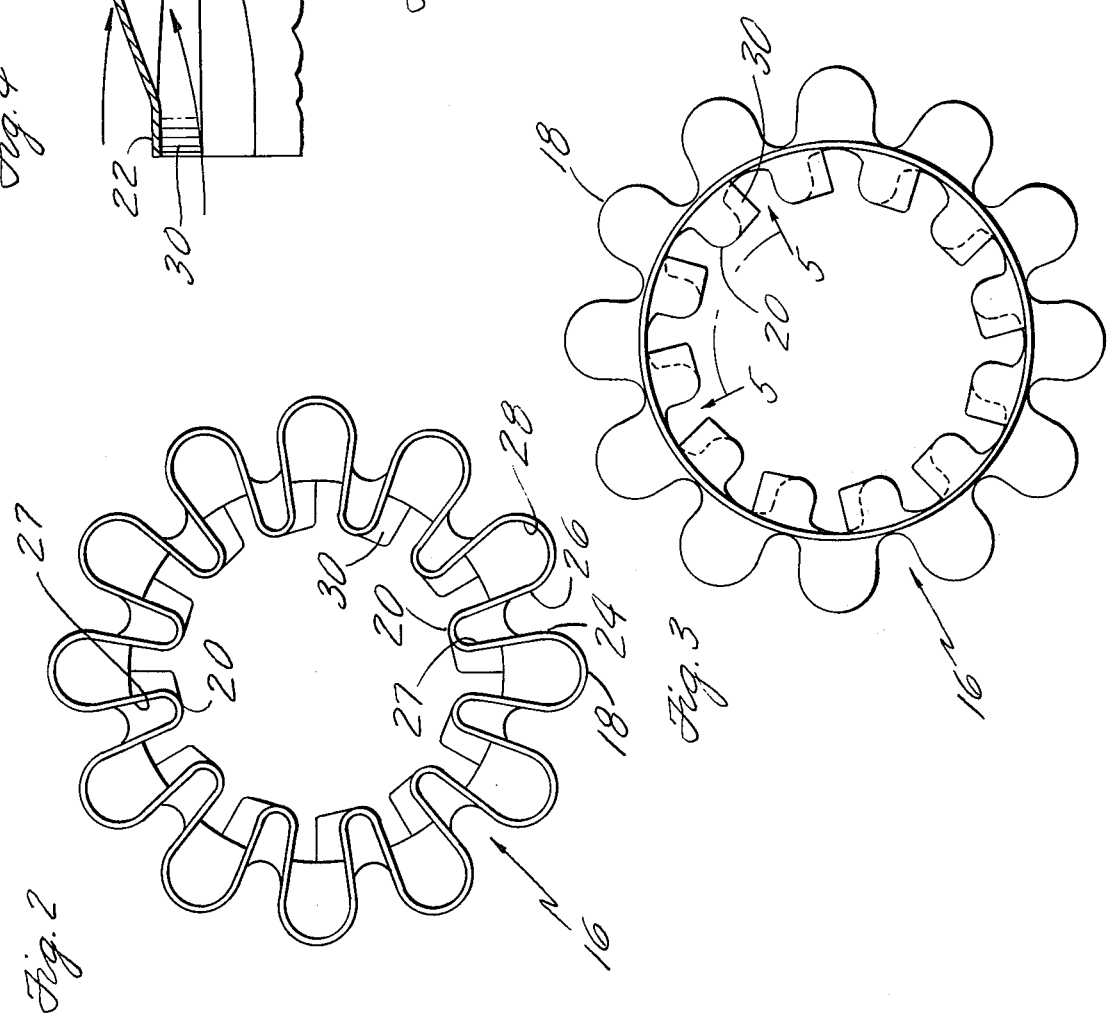

COMBINED GUIDE VANE AND MIXER FOR A GAS TURBINE ENGINE

BACKGROUND OF THE INVENTION

This invention relates to gas turbine fan engines and particularly to the exit guide vane of the turbine and the mixer for the core and fan gaseous flow.

It is well known in engine technology to include a mixer downstream of the turbine to mix the fan discharge air with the turbine discharge air to achieve noise suppression. Typically, the mixer is a lobed type that is, for example, described in U.S. Pat. No. 3,508,403 granted to R. E. Neitzel on Apr. 28, 1970 to which reference should be made for further details.

Typically, turbine gases exhaust with a high swirl velocity component and the guide vanes mounted just downstream of the turbine ahead of the mixer serve to straighten the flow. However, in straightening the exhaust gas an increase in pressure losses results adversely affecting the efficiency of the power plant. Moreover, the turning vanes with their attachment structure are complicated and heavy and require additional space.

Since the lobe mixer acquires some length in order to direct the primary and fan flow into the proper position for mixing, this invention contemplates the effective use of this length by combining the guide vanes with the mixer. This not only shortens the overall length of the engine with a consequential weight savings, it minimizes and even eliminates the pressure losses.

SUMMARY OF THE INVENTION

An object of this inventon is to provide an improved guide vane and mixer for a fan jet engine.

A further object is to combine the turbine exhaust guide vanes and mixer of a fan jet engine.

A still further object is to make the turbine exhaust guide vanes and lobe mixer integral.

Other features and advantages will be apparent from the specification and claims and from the accompanying drawings which illustrate an embodiment of the invention.

BRIEF DESCRIPTION OF THE DRAWING

FIG. 2 is a rear end view of the lobe mixer guide vane unit.

FIG. 3 is a front end view of the lobe mixer-guide vane unit.

FIG. 4 is a partial view in section and elevation as seen through an axial plane.

FIG. 5 is an axial view of the lobe mixer.

DESCRIPTION OF THE PREFERRED EMBODIMENT

Figure 1:
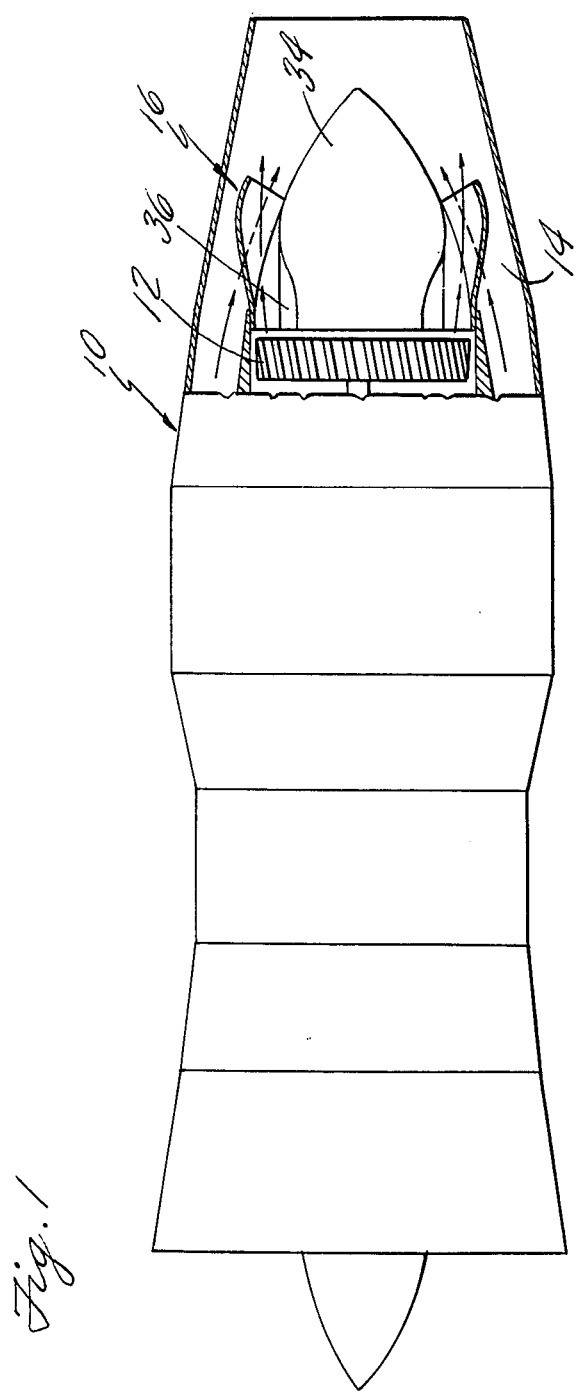
FIG. 1 is a schematic illustrating the mixer-turbine exhaust guide vane construction in relation to a fan-jet engine.

Referring to FIG. 1 which typifies a fan jet engine as for example, the JT-9D manufactured by the Pratt & Whitney Aircraft Division of United Technologies Corporation, which is incorporated herein by reference, generally illustrated by reference numeral 10 which mixes engine core air exhausting from turbine 12 with fan discharge air flowing through annulus 14. Lobe mixer generally indicated by reference numeral 12 may take any well known shape and form and are well known in the art, except to the extent that it is modified herein.

As can best be seen by referring to FIGS. 2 through 5 the mixer is fashioned in a scalloped shaped integral assembly having outer circumferential lobes 18 and inner circumferential lobes 20. The inner lobes extend from a circular section axially rearward with respect to the direction of flow to a reduced diameter to form with the spaced, substantially parallel, side walls 24 and 26 of the lobes, chute or channel 27. Outer lobe 18, having a wider cross section in this configuration as to accommodate larger volume of core gases, extends axially from the circular section 22 to a larger diameter (as viewed in the same direction as lobe 20) and likewise forms chutes or channels 28. These chutes are precisely configured to effectively mix the exhaust core flow and fan flow for an overall engine performance improvement and effective sound suppression. The lobed mixer, per se, is well known and does not form a part of this invention.

In accordance with this invention, the mixer is formed with guide vanes 30 that project toward the engine center line from the bottom of the inner lobes and extend from the inner diameter surface of the wall forming the bottom of chute 27. Guide vanes 30 may be viewed in this embodiment as fairings of the bottom wall of the inner lobes. As can be seen best in FIG. 5, each vane 30 is contoured to receive the exhaust gases from the rotating turbine 12. It will be appreciated that this flow which has a high tangential velocity component will strike against the guide vane turning the flow with substantially no pressure losses inasmuch as the velocity at the inlet will be nearly equal to the velocity at the outlet.

Plug 34, which is aerodynamically streamlined is centered in the mixer 16 forms annular passage 36 and is contoured so that it circumferentially bears against the apex of the lower lobes 20, defining a top cover for chutes 28 trapping all the core flow so that it all passes therethrough.

The gap between the plug and the annular wall 22 which diminishes in the axial rearwardly-extending direction provides sufficient room, which ordinarily would be void, to accommodate guide vanes 30. The guide vanes may extend rearwardly a sufficient distance depending on the turning flow characteristics and structural integrity desired. While in the preferred embodiment it is desirous of having the vanes made integral with the mixer, it is contemplated within the scope of this invention that they extend from the plug and orient with respect to the passages in the mixer.

From the foregoing it is apparent that the turning is done within the mixer eliminating a separate, axially spaced guide vane assembly thereby minimizing the pressure losses incurred as a result of diffusing in the guide vane assembly as well as incurred in the transitional flowing from one assembly to another.

It should be understood that the invention is not limited to the particular embodiments shown and described herein, but that various changes and modifications may be made without departing from the spirit or scope of this novel concept as defined by the following claims.

I claim:

1. A mixer for a fan jet engine power plant located downstream of the turbine for mixing the flow from the turbine and the fan, comprising a sinuous circumferentially shaped body having inner and outer lobes, the inner lobes being closer to the axis of the engine and having a bottom wall, the improvement comprising flow guide means having an upstream portion aligned with the direction of approaching flow and, a downstream portion to circumferentially turn the flow, the flow guide means disposed adjacent the bottom wall extending within the body of the mixer to turn the flow exhausting from said turbine in a predominantly circumferential direction whereby the turning of the turbine exhaust is accomplished within the mixer prior to being mixed with the fan discharge air flow.

2. A mixer as claimed in claim 1 including a plug having an axisymmetrical shape including a wider diameter portion intermediate its ends, and circumferentially bearing against a circumferential portion of said inner lobes.

3. A mixer as claimed in claim 1 in which said guide means are a plurality of guide vanes.

4. A mixer as claimed in claim 3 in which said guide vanes are integral with the bottom wall of said inner lobes.

5. A mixer for a fan jet engine power plant located downstream of the turbine for mixing the flow from the turbine and the fan comprising a circular hollow body portion and a sinuous circumferentially shaped body portion extending axially therefrom, said sinuous shaped body portion defining inner and outer lobes, the inner lobes being closer to the axis of the engine and having a bottom wall, the improvement comprising a plug-like element extending through said mixer having a larger diameter portion bearing against the inner lobes through a transverse plane and a smaller diameter portion defining an annular space adjacent the circular portion, guide-like member disposed adjacent the bottom wall extending within the body of the mixer and having a leading edge extending into the hollow portion of said circular body portion aligned with the direction of approaching flow, and a trailing edge portion to circumferentially turn the flow, whereby the turning of the turbine exhaust in a predominantly circumferential direction is accomplished within the mixer prior to being mixed with the fan discharge air flow at the exhaust end of said mixer.

* * * * *